J. Evans,
Elevator.
No. 56,915.  Patented Aug. 7, 1866.
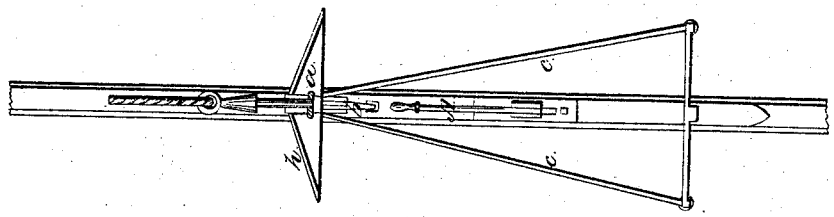
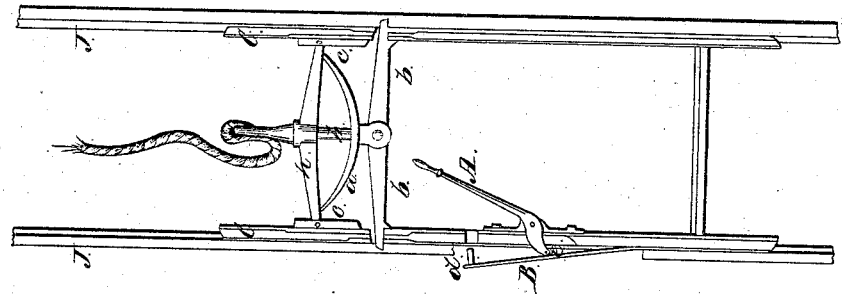
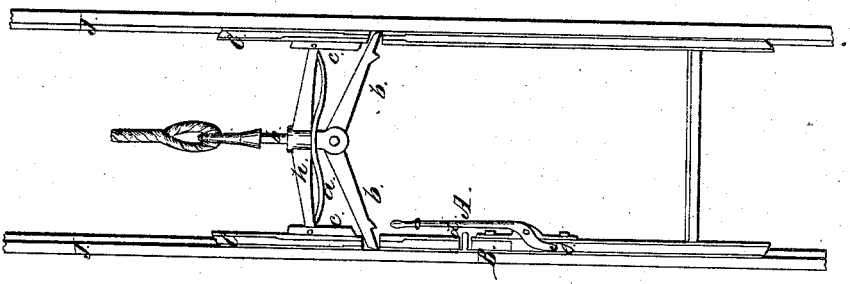
Witnesses:
O. W. M. Smith
Jos. Mosheimer
Inventor:
John Evans
By his atty's
Dewey & Co.

UNITED STATES PATENT OFFICE.

JOHN EVANS, OF VIRGINIA CITY, NEVADA.

IMPROVED SAFETY-CAGE FOR MINES.

Specification forming part of Letters Patent No. 56,915, dated August 7, 1866.

*To all whom it may concern:*

Be it known that I, JOHN EVANS, of the city of Virginia, county of Storey, State of Nevada, have invented certain new and useful Improvements on Safety-Cages for Hoisting from Mines, &c.; and I do hereby declare that the following is a full, clear, and exact description of the construction and operation of the same, reference being had to the accompanying drawings, making part of this specification, in which—

Figure 1 is a longitudinal section. Fig. 2 is also a longitudinal section, showing the spring and bar A B thrust outward; Fig. 3, transverse section.

The nature of my improvement consists in the application to the ordinary safety-cage of a lever to which is attached a spring arranged in such a manner that by pulling the lever downward the spring is violently thrust against the side of the shaft or guides, and so arrests the speed of the cage that the rope will be slackened, allowing the dogs to catch the ways or guides, which stops the car as readily as if the rope had been broken.

To enable others skilled in the art to make and use my improvement on safety-cages, I will proceed to describe its construction and operation.

Referring to the drawings, A A A is a lever attached to the sides of the cage, having a friction-roller, $e$, at its lower end, which operates against the bar B, and enables the operator more easily to force out the bar B against the sides of the shaft or ways. At the upper end of this spring-bar B is a guide-pin, $d$, which, when not in operation, the bar is closed up by the pin passing through the side of the cage.

The hoisting-rope is attached to the rod $t$, to the lower end of which are fastened the dog-bars $b\ b$. Between these and the cross-bar $h$ is placed the spring $a$.

During ordinary work the cage rests, by the cross-bar $h$, on the shoulders of the rod $t$, the weight of the cage keeping the spring $a$ in the position shown in Fig. 1. Should the rope break, the weight being taken off the rod $t$, the spring $a$ forces the dog-bars $b\ b$ downward, their points being thrust into the guides or ways at each side of the shaft, and arrests the descent of the cage. The heavier the weight now added the more firm and deep are the points of the dogs embedded in the timber; but should any portion of the machinery give way by reason of insufficiency the cage must inevitably fall to the bottom of the shaft; but by the attachment of my improvement to the cage, (the lever and spring,) should any defect to the machinery place the cage beyond the control of the brakeman, a man standing on the platform, by pulling the lever A, thrusts the spring B violently against the side of the shaft or ways, which so arrests the descent of the cage that the rope will be slackened, allowing the dogs to catch the wood as readily and stopping the car as effectually as if the rope had been broken, thus preventing accident from the insufficiency of the machinery to hold the weight placed upon it.

Having thus described my improvement for safety-cages, I will now proceed to state what I claim and desire to secure by Letters Patent—that is to say:

The employment or use of the lever A, spring-bar B, with the friction-roller $e$, and guide-pin $d$, or their equivalents, when arranged substantially as described, and for the purpose set forth.

In witness whereof I have hereunto set my hand and seal this 28th day of November, A. D. 1865.

JOHN EVANS. [L. S.]

Witnesses:
P. H. SCOTT,
CHARLES McELHONE.